(12) United States Patent
Okamura

(10) Patent No.: US 8,218,730 B2
(45) Date of Patent: Jul. 10, 2012

(54) MECHANISM AND X-RAY TUBE APPARATUS

(75) Inventor: Hidefumi Okamura, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 315 days.

(21) Appl. No.: 12/663,716

(22) PCT Filed: Jun. 12, 2008

(86) PCT No.: PCT/JP2008/060736
§ 371 (c)(1),
(2), (4) Date: Dec. 9, 2009

(87) PCT Pub. No.: WO2008/153089
PCT Pub. Date: Dec. 18, 2008

(65) Prior Publication Data
US 2010/0166149 A1    Jul. 1, 2010

(30) Foreign Application Priority Data
Jun. 13, 2007   (JP) ................................ 2007-155960

(51) Int. Cl.
*H01J 35/00* (2006.01)
(52) U.S. Cl. ........................................ 378/133; 428/687
(58) Field of Classification Search .................. 378/133; 428/687
See application file for complete search history.

(56) References Cited

U.S. PATENT DOCUMENTS
6,125,168 A * 9/2000 Bhatt ............................ 378/132

FOREIGN PATENT DOCUMENTS
JP   8-55595      2/1996
JP   2004-204890  7/2004

OTHER PUBLICATIONS
Translation for JP 2004-204890 published on Jul. 22, 2004.*

* cited by examiner

Primary Examiner — Glen Kao
(74) Attorney, Agent, or Firm — Cooper & Dunham LLP

(57) ABSTRACT

A mechanism to which a liquid-repellent structure hard to be exfoliated is applied.

The tip of each of microprojections has a generally spherical surface. When a liquid metal (8) comes into contact with such a surface, the liquid metal (8) cannot enter the spaces among microprojections and is supported by the surfaces of the tips only with point contact.

Therefore, the liquid metal (8) neither wets the surface of the base material nor spread over the surface.

The liquid-repellent surface (11) has a structure such that the liquid metal (8) is supported by point contact of the many microprojections and repelled by the surface (11), and does not wet the surface (11).

7 Claims, 11 Drawing Sheets

PATTERN DIAGRAM OF LIQUID-REPELLENT SURFACE

UNTREATED BASE METERIAL SURFACE
AND ITS WETTABILITY

CONCAVO-CONVEX MEASURE <0.5 μm
(IRON MATERIAL NOT INCLUDING CHROME +
Wet HYDROGEN HEAT TREATMENT)

CONCAVO-CONVEX MEASURE = 4.0~5.0 μm
(IRON MATERIAL NOT INCLUDING CHROME +
Dry HYDROGEN HEAT TREATMENT)

CONCAVO-CONVEX MEASURE >5.0 μm
(IRON MATERIAL NOT INCLUDING CHROME + Dry HYDROGEN HEAT TREATMENT)

MECHANISM AND X-RAY TUBE APPARATUS

TECHNICAL FIELD

The present invention relates to a liquid-repelling technique for liquid metals, particularly to a technique related to the mechanism including an X-ray tube device to which a liquid-repellent surface structure that is non-wetting for repelling liquid metal is applied.

BACKGROUND ART

Liquid metals formed by alloy of gallium, indium and stannum are known for having a low melting point and are innocuous, thus has been replaced with mercury in the industrial field. In this case, adhesive property of liquid metal formed by alloy of gallium, indium and stannum has been a major impediment. Liquid metals are an eutectic alloy and highly reactive to other substances, thus is difficult to remove once adhered to the surface of other substances. For this reason, it is necessary to treat the surfaces by coating with oxides such as gallium oxide or titanium oxide for repelling liquid metal (preventing from getting wet).

The techniques for forming the liquid-repellent surface (non-wetting surface) to repel liquid metal are disclosed in, for example, Patent Documents 1 and 2 below. It is a technique to form a film of oxides such as titanium oxide or aluminum oxide by a method such as physical vapor deposition (PVD) for forming a liquid-repellent surface having the liquid-repellent action of the oxide film. The technique also forms an oxide layer on the surface of a base material for forming the liquid-repellent surface having the liquid-repellent action of the oxide layer.

Patent Document 1: JP-A-H8-55595
Patent Document 2: JP-A-H11-93946

DISCLOSURE OF THE INVENTION

Problems to be Solved

In the above-mentioned conventional technique for forming a liquid-repellent surface having the liquid-repellent action of the film or layer of oxides, the exfoliation of the film or layer of oxides could cause a problem. If exfoliation occurs, it poses a problem on, for example, a fluid slide bearing.

The objective of the present invention is to provide a mechanism to which a hard to be exfoliated liquid-repellent surface structure is applied taking the above-described problem into consideration.

Means to Solve the Problem

The mechanism of the present invention for achieving the above-described objective for encapsulating liquid metal and has the liquid-repellent and non-wetting surface structure that repels the liquid metal is characterized in having, on a base material surface, multiple microprojections which point contact the liquid metal so as to be retained the surface tension of the liquid metal.

Also, the X-ray tube device of the present invention for achieving the above-described objective has an non-wetting surface structure which repels the liquid metal to be applied on the boundary portion between a bearing gap and the vacuum in a fluid slide bearing for rotary anode, and is characterized in having, on a base material surface, multiple microprojections which point contact the liquid metal so as to be retained the surface tension of the liquid metal.

Also, the manufacturing method of the liquid-repellent surface related to the present invention is to execute a heat treatment to iron alloy including chrome in a hydrogen atmosphere including water vapor with the heat which is annealing temperature of the iron alloy and above so as to make the surface of the iron alloy the non-wetting surface that repels the liquid metal.

In accordance with the present invention which has above-described characteristics, the liquid-repellent surface is created not by providing the liquid-repellent and non-wetting surface having the liquid-repellent action of the film or layer of oxides, but by structurally changing a base material surface itself from the original condition. By providing multiple microprojections on a base material surface, the liquid metal gains the condition to be retained itself using its own surface tension. Accordingly, it is possible to prevent the liquid metal from getting wet by the multiple microprojections provided on the base material surface.

Thus in accordance with the present invention, under high vacuum environment inside of an X-ray tube of an X-ray tube device, it is possible to prevent a liquid metal from leaking into the vacuum.

Effect of the Invention

In accordance with the present invention, it is possible to provide a mechanism to which a liquid-repellent surface structure hard to be exfoliated is applied.

BRIEF DESCRIPTION OF THE DIAGRAMS

DESCRIPTION OF REFERENCE NUMERALS

1: rotary anode, 2: anode target, 3: anode rotation axis, 4: heat insulator, 5: liquid metal bearing, 6: fixed axis, 7: rotor bearing, 8: liquid metal, 9: anode rotor, 10: thrust bearing, 11:

liquid-repellent surface, 12: outer container, 13: coil, 14: heat generator, 15: heat absorber, 16: transport piping, 17:electromagnetic pump, 18:circulation, 19:radiator, 20: fin

BEST MODE FOR CARRYING OUT THE INVENTION

Figure 1:
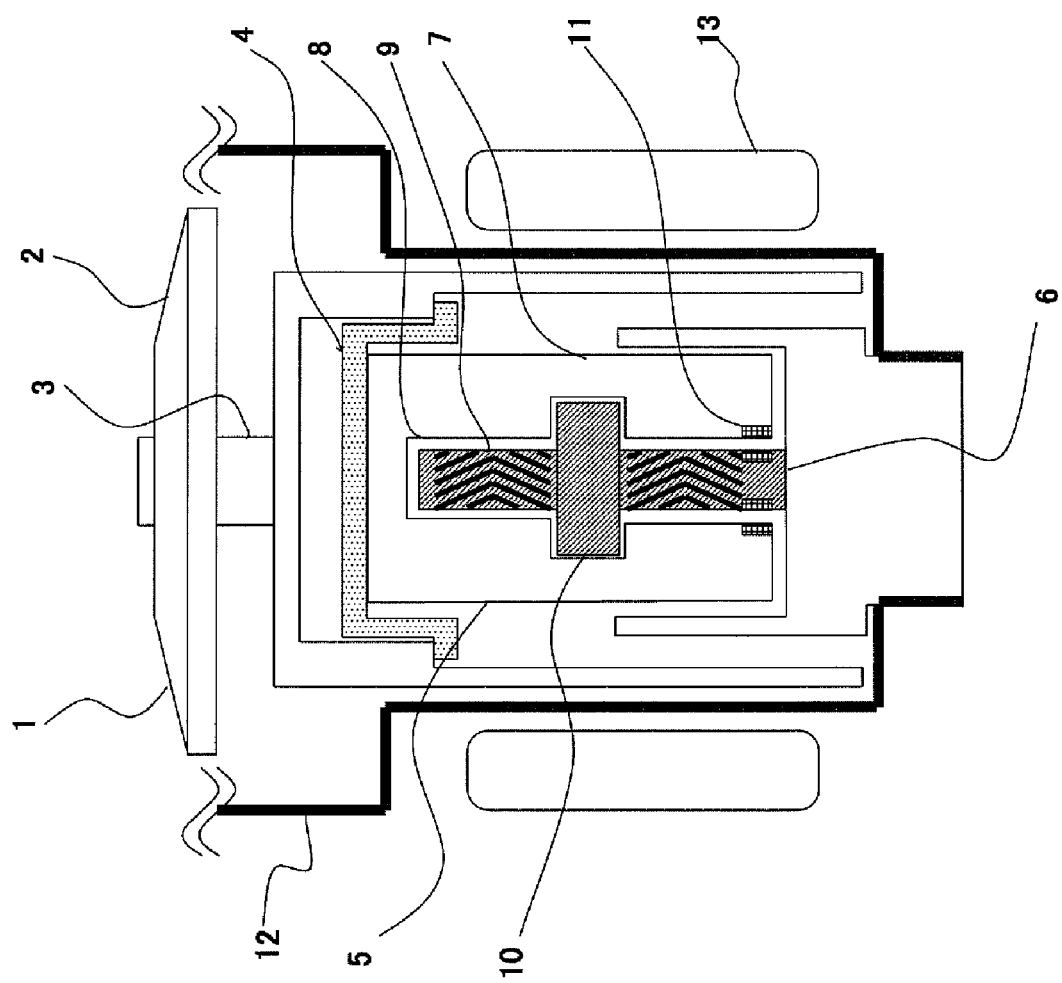
FIG. 1 is a schematic view of a rotary anode of an X-ray tube showing an embodiment of the X-ray tube device related to the present invention.

The present invention will be described below referring to the diagrams. FIG. 1 is a schematic view of the rotary anode of an X-ray tube showing an embodiment of the X-ray tube device related to the present invention.

In FIG. 1, reference numeral 1 indicates an example of the rotary anode in an X-ray tube of an X-ray tube device. The rotary anode 1 is configured by anode target 2 which generates X-rays by collision of the thermal electrons emitted from a cathode, anode rotation axis 3 mounted in the center of anode target 2, u4 for preventing the deterioration of the axis due to inflow of heat from anode target 2, and liquid metal bearing 5.

Liquid metal bearing 5 has fixed axis 6 and rotor bearing 7. In liquid metal bearing 5, liquid metal 8 is filled in the joint gap between fixed axis 6 and rotor bearing 7. Liquid metal bearing 5 is retained so as to hold the gap between fixed axis 6 and rotor bearing 7 constant during rotation of anode using the dynamical pressure generated in liquid metal 8.

Liquid metal 8 is formed by alloy of gallium/indium/stannum, and Galinstan (registered trademark; eutectic alloy; liquid at ordinary temperature; composition:gallium 68.5%, indium 21.5%, stannum 10%; boiling point>1300° C.; melting point: −19° C.; specific gravity:6.44 g/cm$^3$) is used here.

On the surface of fixed axis 6, a spiral sulcus is provided (reference numeral is omitted). Fixed axis 6 is configured to gain high load bearing capacity by raising the dynamical pressure generated by the spiral sulcus. Reference numeral 9 indicates an anode rotor. Also, reference numeral 10 indicates a thrust bearing. Anode rotor 9 is formed by assembling anode target 2, anode rotation axis 3, heat insulator 4 and rotor bearing 7 as shown the diagram.

Rotary anode 1 and the cathode which is not shown in the diagram are disposed opposite to each other in outer container 12. The inside of outer container 12 is vacuumized for insulation. Rotary anode 1 and the cathode are held inside of such outer container 12. On the outside of outer container 12, coil 13 for rotating rotary anode 1 is disposed. Coil 13 is disposed so as to generate rotating magnetic field around rotary anode 1. A rotating magnetic field is generated by coil 13 whereby generating an eddy current on the surface of anode rotation axis 3, and rotary anode 1 can rotate attributed to the action of the eddy current and the rotating magnetic field.

In the slide bearing wherein liquid metal 8 is used as lubricant agent, one of either fixed axis 6 or rotor bearing 7 has a cylindrical form with a bottom. Having the configuration of cylindrical form with a bottom allows, when fixed axis 6 or rotor bearing 7 is rotated, the bearing gap to be retained constant due to the dynamical pressure generated in the gap between fixed axis 6 and rotor bearing 7 with respect to liquid metal 8, which facilitates smooth rotation.

In the bearing gap between fixed axis 6 and rotor bearing 7, there is a boundary surface between the outside. In this boundary surface, liquid metal 8 contacts the outside. In other words, liquid metal 8 working as lubricant agent is exposed to vacuum inside of the X-ray tube. Therefore, since it is significant to prevent leakage of liquid metal 8 into the vacuum in this boundary portion, liquid-repellent surface 11 is provided in the present embodiment.

Liquid-repellent surface 11 is provided on each surface of fixed axis 6 and rotary bearing 7 disposed in the vicinity of vacuum boundary, which makes the surfaces non-wetting by repelling liquid metal 8. Liquid-repellent surface 11 is made as liquid-repellent and non-wetting not by using the liquid-repellent action of the film or layer of oxides as conventional techniques, but by structurally changing a base material surface itself from the original condition.

In concrete terms, multiple microprojections are provided all over the base material surface, which causes liquid metal 8 to be retained by its own surface tension. In the present embodiment, liquid-repellent surface 11 is formed by the multiple microprojections on the base material surface, whereby preventing liquid metal 8 from getting wet. The above-mentioned microprojections will be described in detail later.

Figure 2:
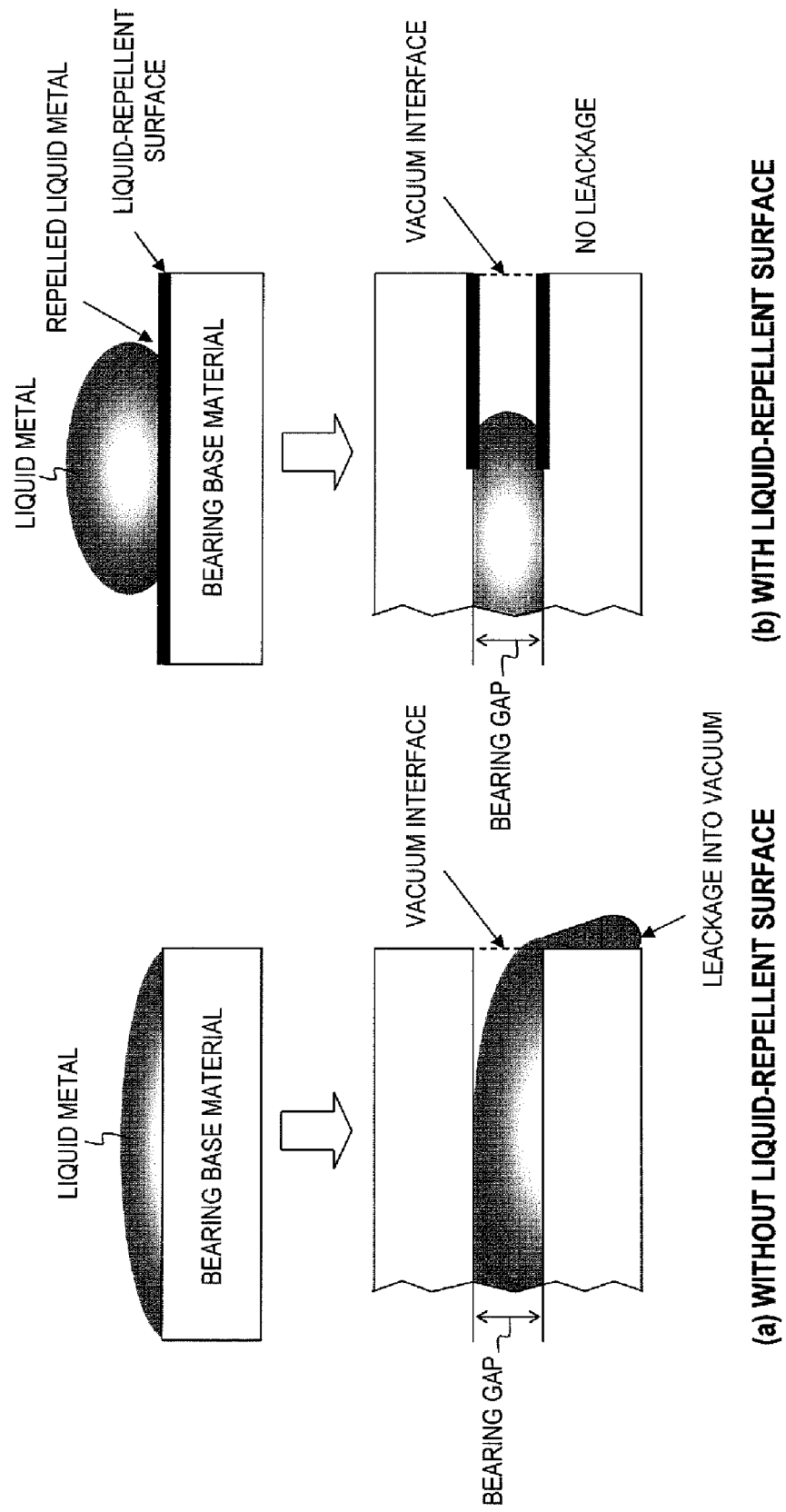
FIG. 2 is a principle illustration about preventing leakage of liquid metal using a liquid-repellent surface.

Here, the principle in preventing liquid metal 8 from getting wet will be described referring to FIG. 2. FIG. 2 is a principle explanatory diagram about preventing leakage of liquid metal using a liquid-repellent surface (the reference numerals are omitted in FIG. 2).

In a slide bearing, dynamical pressure is generated due to fluidity of liquid metal 8 being pulled by rotor bearing 7 so that the bearing gap is to be held constant for smooth rotation. For this reason, the material for bearings should conform to liquid metal 8, i.e. the material which gets wet easily. Therefore, when liquid metal 8 is dribbled on the bearing base material of which the material gets wet easily, liquid metal 8 runs all over the bearing base material as shown in the upper part of FIG. 2(a). If the bearing gap is formed under this condition as shown in the lower part of FIG. 2(a) and the bearing gap is filled with liquid metal 8, liquid metal 8 leaks out of the vacuum boundary portion.

At the same time, if the non-wetting surface which repels liquid metal 8, i.e. liquid-repellent surface 11 related to the present embodiment is formed as shown in the upper part of FIG. 2(b), liquid metal 8 attains the condition not to flow out but to be retained by its own surface tension. Then by forming liquid-repellent surface 11 on both fixed axis 6 and bearing rotor 7 by which the bearing gap is formed as shown in the lower part of FIG. 2(b), leakage of liquid metal 8 into the vacuum can be prevented.

Figure 3:
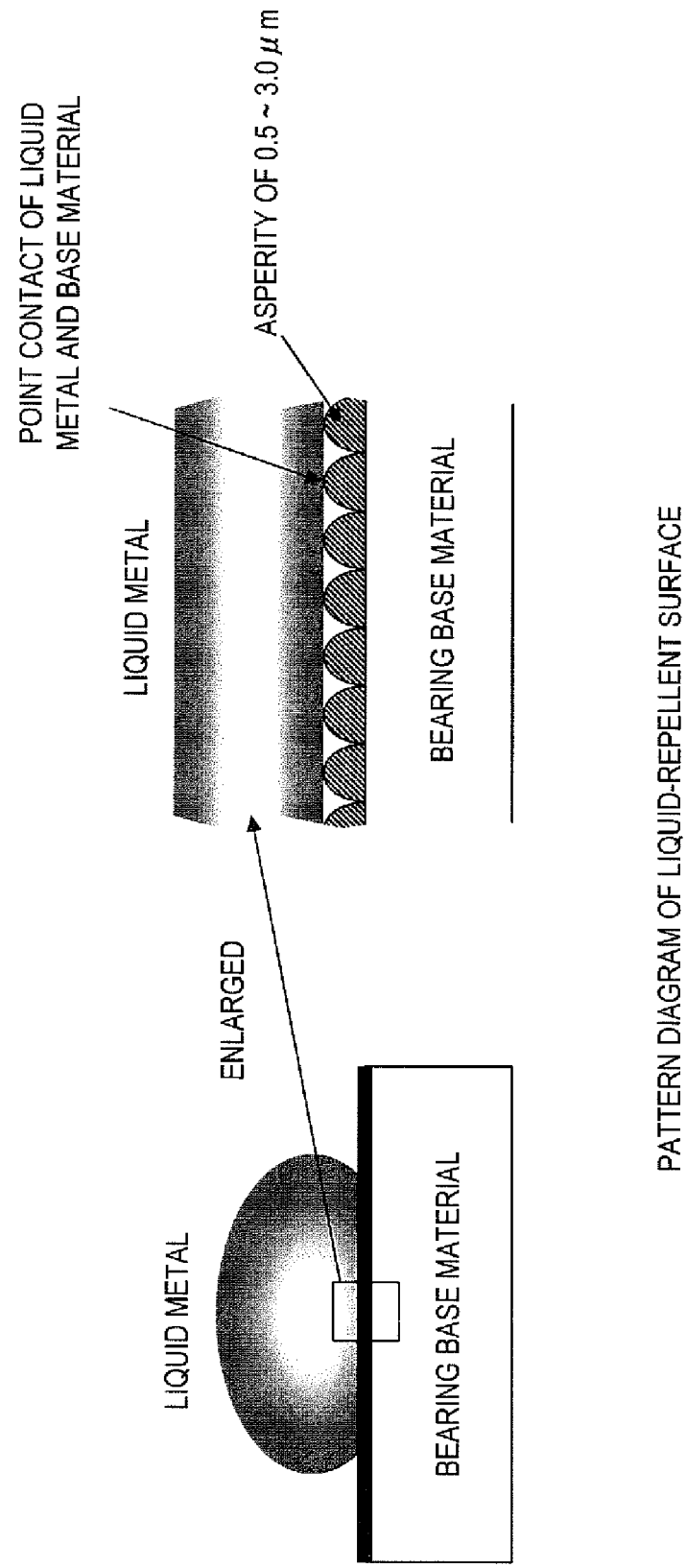
FIG. 3 is a pattern explanatory diagram liquid-repellent principle for repelling liquid metal, using the liquid-repellent surface wherein multiple microprojections are provided all over the surface.

FIG. 3 is a pattern explanatory diagram of liquid-repellent principle for repelling liquid metal by liquid-repellent surface provided all over with the above-mentioned multi microprojections related to the present embodiment (reference numerals are omitted in FIG. 3; the cross-section of microprojections are shaded for the purpose of making the position of the base material surface easy to be recognized).

In FIG. 3, the structure of liquid-repellent surface 11 is indicated in the case that liquid metal 8 formed by alloy of gallium/indium/stannum is used as lubricant agent and die steel (SKD 11) is used as a bearing base material. Here, processing of 1000° C. is carried out in Wet hydrogen having a dew point of 27° C. which causes multiple microprojections that are about 0.1~3.0 μm to be produced on the metal base surface as shown in the enlarged part of the diagram (the microprojections are not attached to the metal base surface, but the metal base surface itself is structurally changed from its original state by the generation of multiple microprojections), whereby creating the non-wetting structure that repels liquid metal 8 being point contacted by the multiple microprojections. Wet hydrogen is hydrogen atmosphere including water vapor, which can be obtained by passing hydrogen gas through water. The dew point of Wet hydrogen is the temperature that hydrogen gas passes through water.

Figure 4:
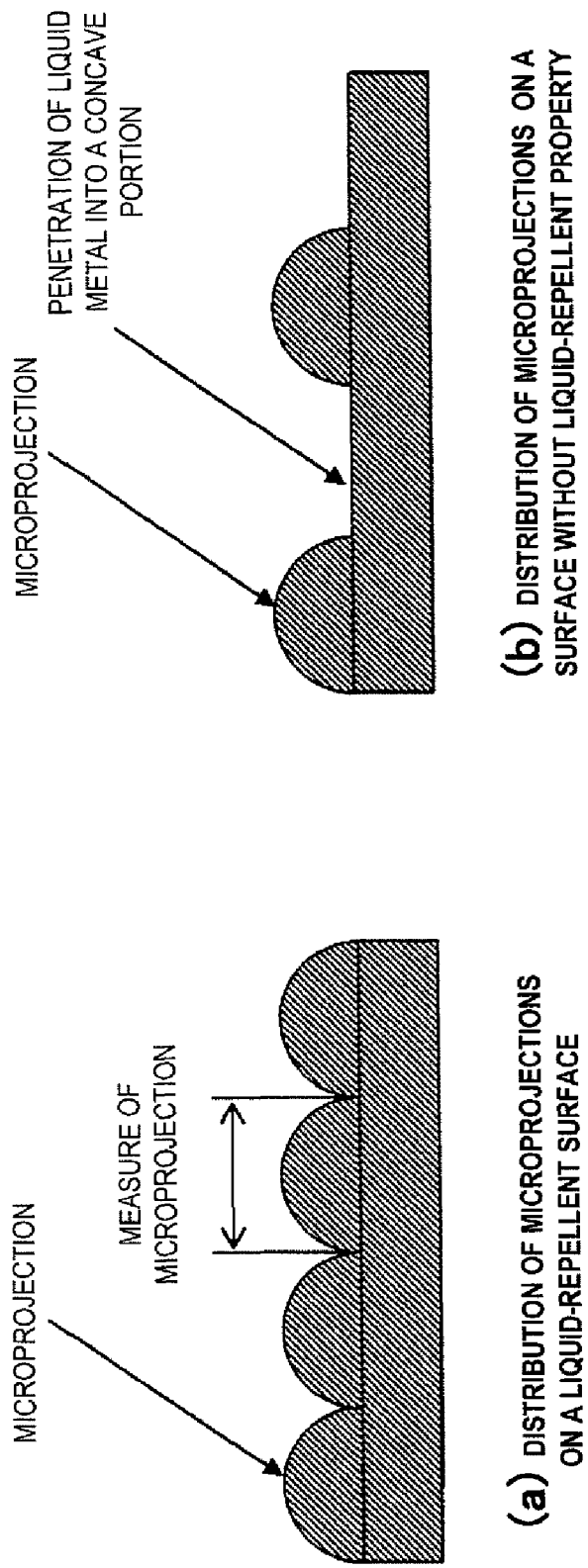
FIG. 4 is a pattern diagram showing the measure of projections and distribution condition of microprojections.

The measure of the above-mentioned microprojections is as shown in FIG. 4. The microprojections are distributed in the condition being adjacent to each other as shown in FIG.

4(a). By such distribution, the support by the above-described point contact with respect to liquid metal 8 (the reference numeral is omitted in the diagram) is achieved. At the same time, if the distribution is as shown in FIG. 4(b) where liquid metal 8 enters into the concave portions between the microprojections, repellent property against liquid metal 8 ceases to be in effect.

The principle that the surface attains liquid-repellent property by multiple microprojections will be described referring to FIG. 3 and FIG. 4. The tip of microprojections has a generally spherical shape (for example, the shape close to a hemispherical shape), in the condition that liquid metal 8 contacts the surface having such shape, liquid metal 8 cannot enter the spaces among microprojections and is supported by only point contact of the end surfaces of microprojections. For this reason, liquid metal 8 will not spread over the metal base surface. This indicates the principle that the present embodiment attains the liquid-repellent property.

Next, the above-mentioned processing for producing multiple microprojections will be described. In the case of using liquid metal 8 formed by alloy of gallium/indium/stannun as lubricant agent, the desirable measure of microprojections (width and height) is about 0.5~3.0 μm. While there are variety of methods for producing multiple microprojections of such measure, we recommend here the method using die steel (SKD11) in Wet hydrogen atmosphere wherein the dew point is higher than 10° C. and lower than 40° C. to perform a heat treatment with the heat higher than the annealing temperature (about 800° C.). When this processing is performed, multiple micro-projections of about 0.5~3.0 μm as shown in FIG. 5 are produced on the die steel surface in the nearly uniform condition, and the surface which is capable of repelling liquid metal 8 can be formed.

Figure 5:
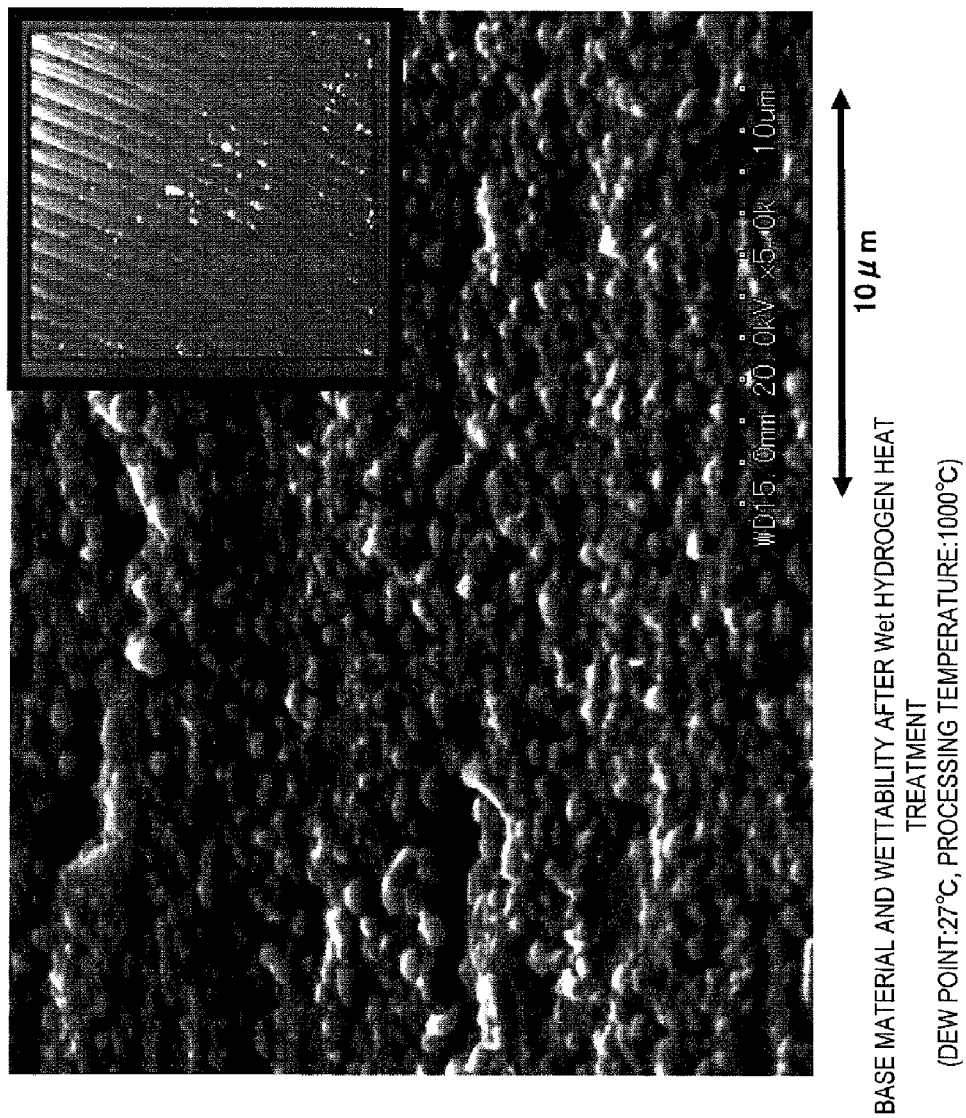
FIG. 5 shows a base surface and its wetness condition after Wet hydrogen heat treatment.

On analyzing the surface in FIG. 5, it has been found that the chrome exists being concentrated in the basal side of microprojections and the existence of chrome becomes sparse at the end side thereof. As a result of this, we have found that chrome which makes up about 12% of alloy element is related to the production of the microprojections in the above-described processing. Therefore, the same effect can be expected even when iron alloy other than the above-described die steel is used, as long as chrome is included therein.

Figure 6:
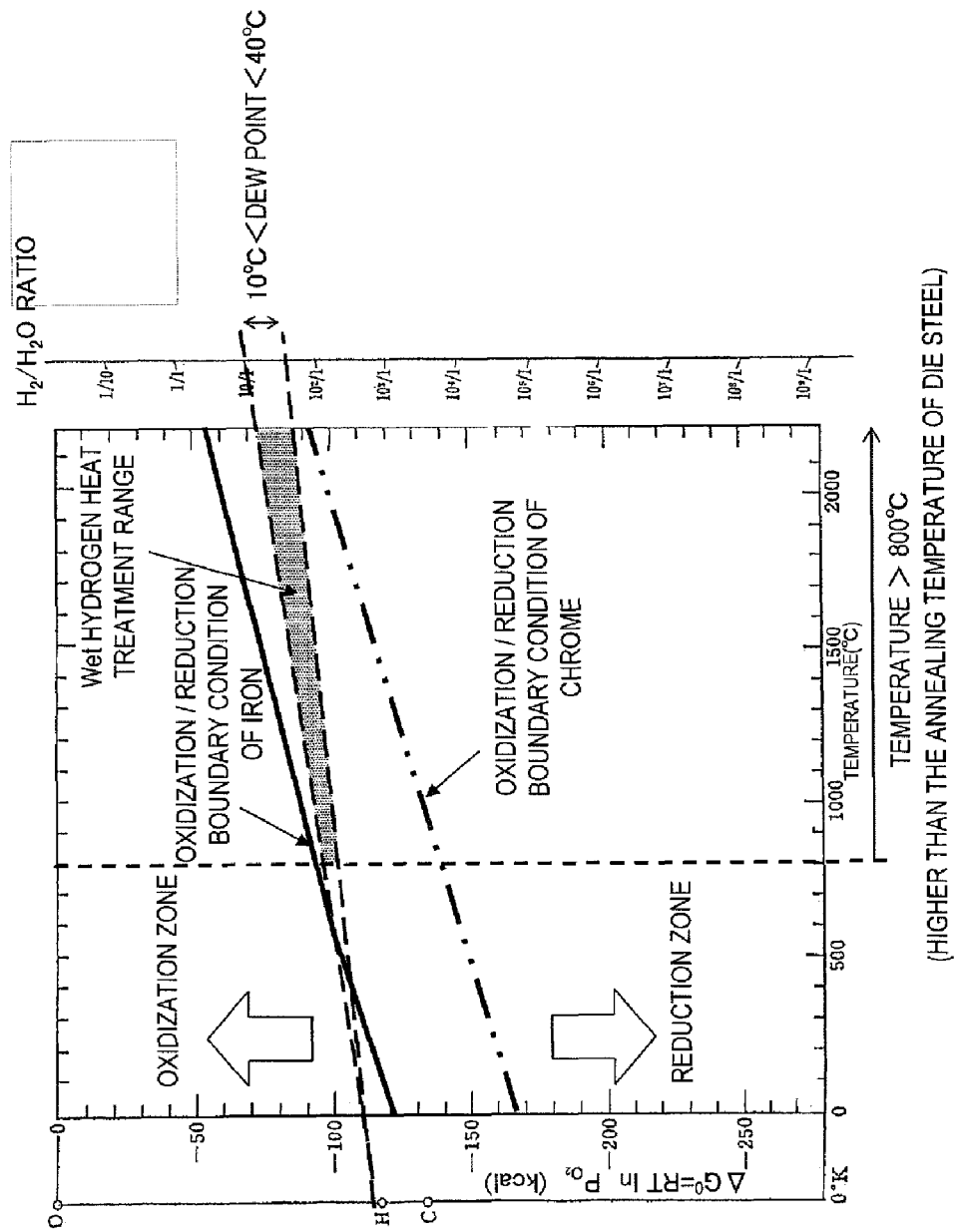
FIG. 6 shows the thermodynamic state of Wet hydrogen heat treatment.

While the heat treatment is carried out in order to produce multiple microprojections in Wet hydrogen atmosphere wherein the dew point is 10° C. and higher or 40° C. and lower with the annealing temperature of 800° C. and higher as shown above, the processing condition is for iron to be reduced thus the metal base surface will not be oxidized as shown in FIG. 6. On the other hand, chrome will be oxidized under this condition. With all these factors, the above-described processing produces liquid-repellent surface 11 under the condition of reduction of iron and oxidization of chrome, not by conventional liquid-repellent using mere oxidized films or oxides. While the conventional liquid-repellent using mere oxidized films and oxides has a problem, for example, that reduction of the oxidized film or oxide may occur in the case under the environment of high vacuum and high temperature such as the inside of an X-ray tube in an X-ray tube device, liquid-repellent surface 11 of the present embodiment has an effect to solve this problem.

Figure 7:
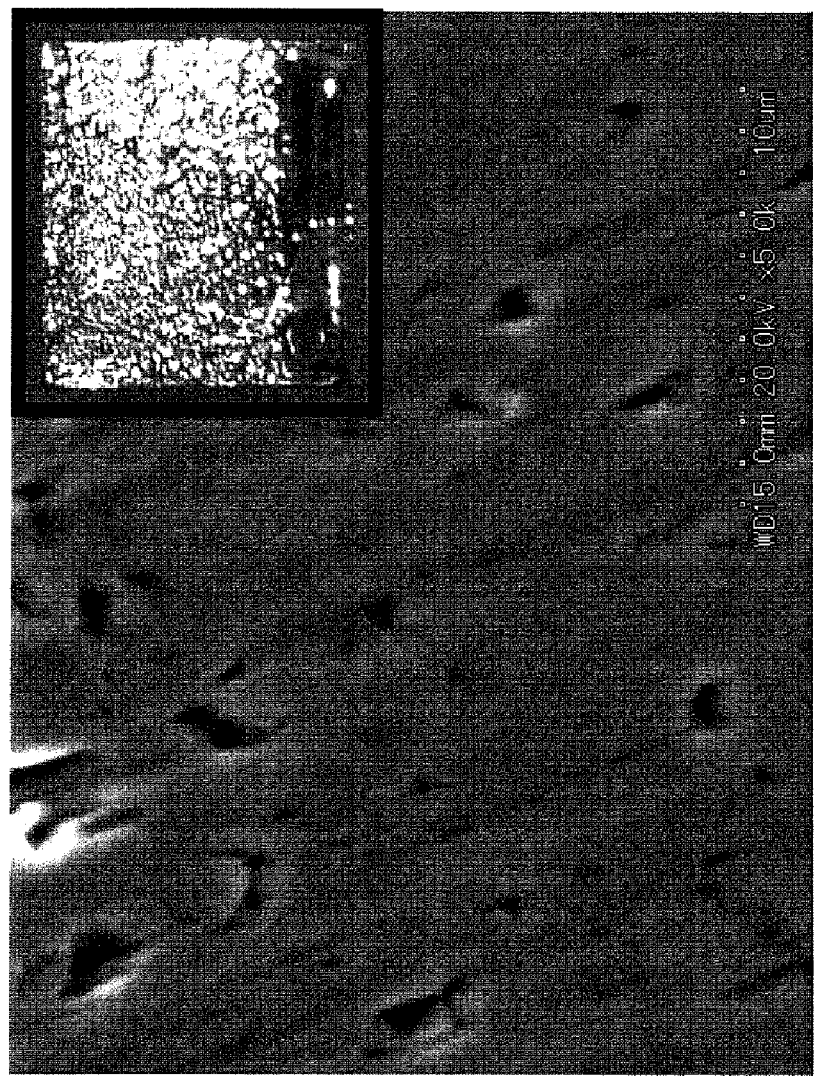
FIG. 7 shows the condition of an untreated base material surface.
Figure 8:
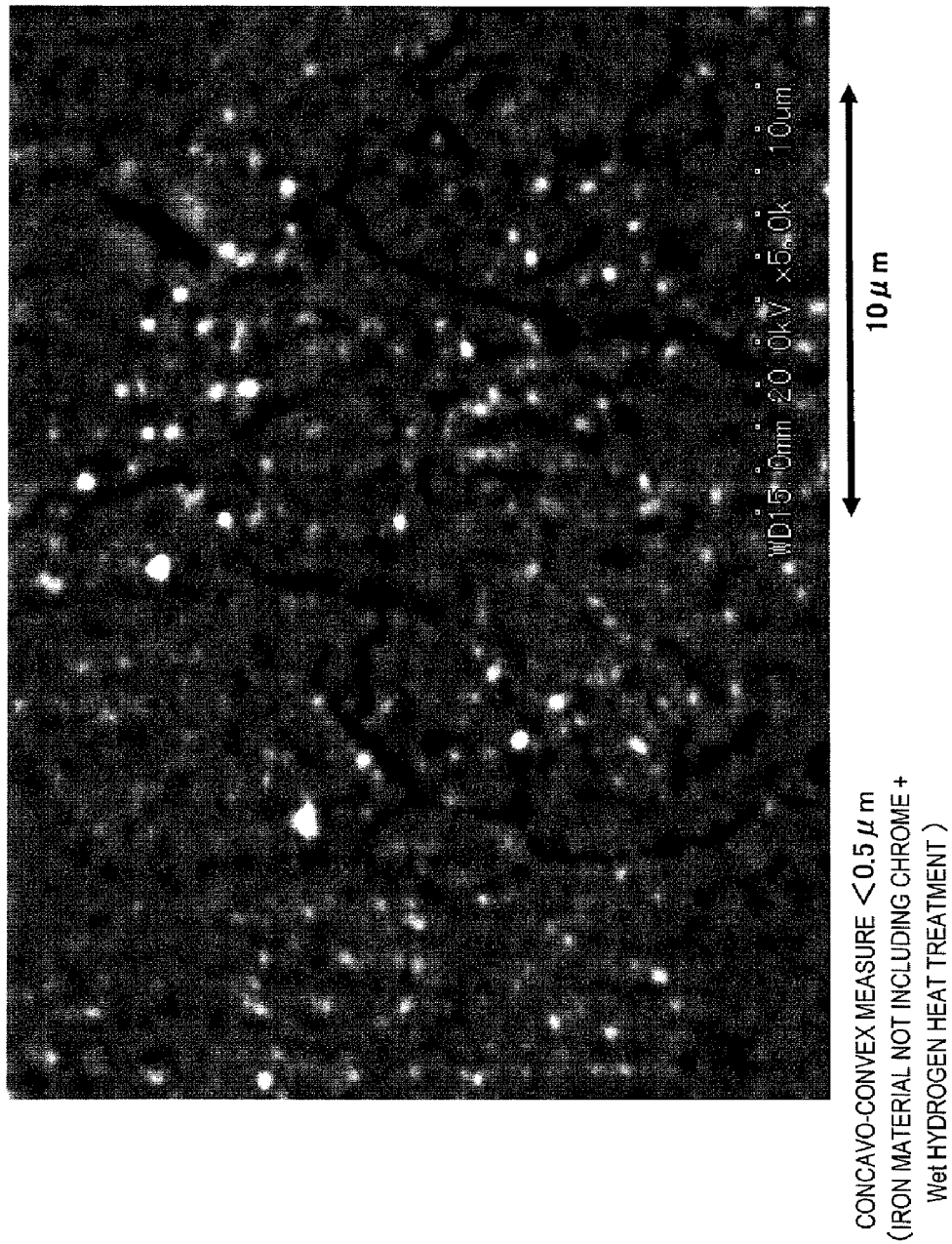
FIG. 8 shows the case that the measurement of a microprojection is less than 0.5 μm in the condition of iron material not including chrome+Wet hydrogen heat treatment is used.
Figure 9:
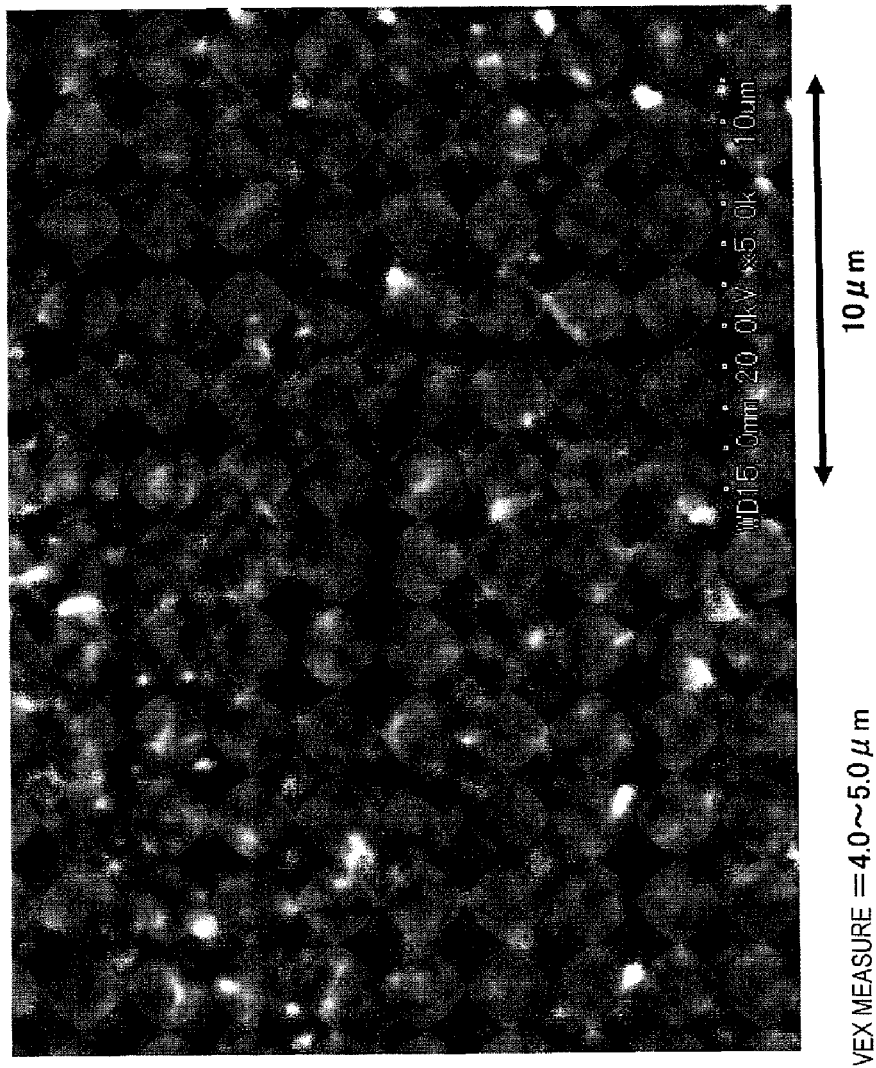
FIG. 9 shows the case that the measurement of a microprojection is around 4.0~5.0 μm in the condition of iron material not including chrome+Dry hydrogen heat treatment is used.
Figure 10:
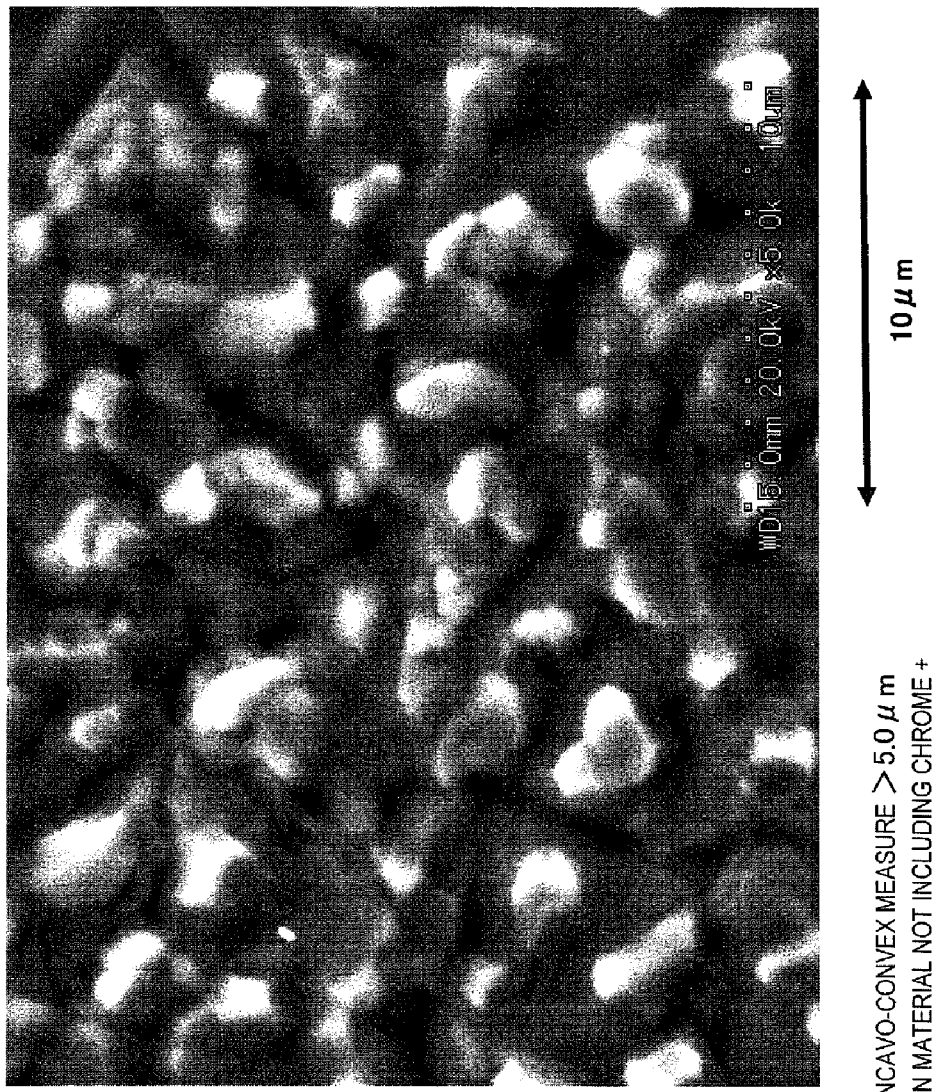
FIG. 10 shows the case that the measurement of a microprojection exceeds 5.0 μm in the condition of iron material including chrome+Dry hydrogen heat treatment is used.

FIG. 7 is for comparing with FIG. 5, and shows the untreated condition of a base material surface. It has been found that the metal base surface gets wet by liquid metal 8 in the case that the base material surface is in the untreated condition. FIG. 8 is also for the purpose of comparison, and shows the case that the measure of microprojections is less than 0.5 μm in the condition of iron material not including chrome+Wet heat hydrogen treatment. It has been found that the metal base surface also gets wet by liquid metal 8. FIG. 9 is also for the purpose of comparison, and shows the case that the measure of microprojections is about 4.0~5.0 μm in the condition of iron material not including chrome+Dry hydrogen heat treatment. Being different from FIGS. 7 and 8, the measure of microprojections is somewhat larger in this case, and it has been found that the metal base surface is easy to get wet by liquid metal 8. FIG. 10 is also for the purpose of comparison, and shows the case that the measure of microprojections exceeds 5.0 μm in the condition of iron material including chrome+Dry heat hydrogen treatment. In this case, since the measure of microprojections is even larger than the one in FIG. 9, it has been found that the metal base surface gets wet by liquid metal 8. Further, in the case of pure iron+Wet hydrogen heat processing though not shown in the diagram, microprojections cannot be formed thus the metal base surface gets wet by liquid metal 8.

Other than the above-described processing, the method for structurally changing the surface of base material itself from the original condition by sandblasting the metal base surface or the method for changing the surface of base material itself from the original condition by flame spray coating can be cited (the method for attaching microprojections on a base material may be used only when it is infallible that the microprojections will not be exfoliated). Also, while the alloy formed by gallium/indium/stannum has been described as liquid metal 8, the present invention is not limited to this, and for example, gallium, gallium alloy, indium alloy, stannum alloy, mercury or natrium may be used instead.

While an X-ray tube device has been cited above as an example for applying liquid-repellent surface 11, the devices other than the X-ray tube device may be used to apply liquid-repellent surface 11. For example, it may be applied to a hard disk drive having a fluid slide bearing as in the same manner as an X-ray tube device. Also, liquid-repellent surface 11 of the present embodiment is applicable to any members or parts wherein liquid-repellent property is desired. Several examples thereof will be described below.

Figure 11:
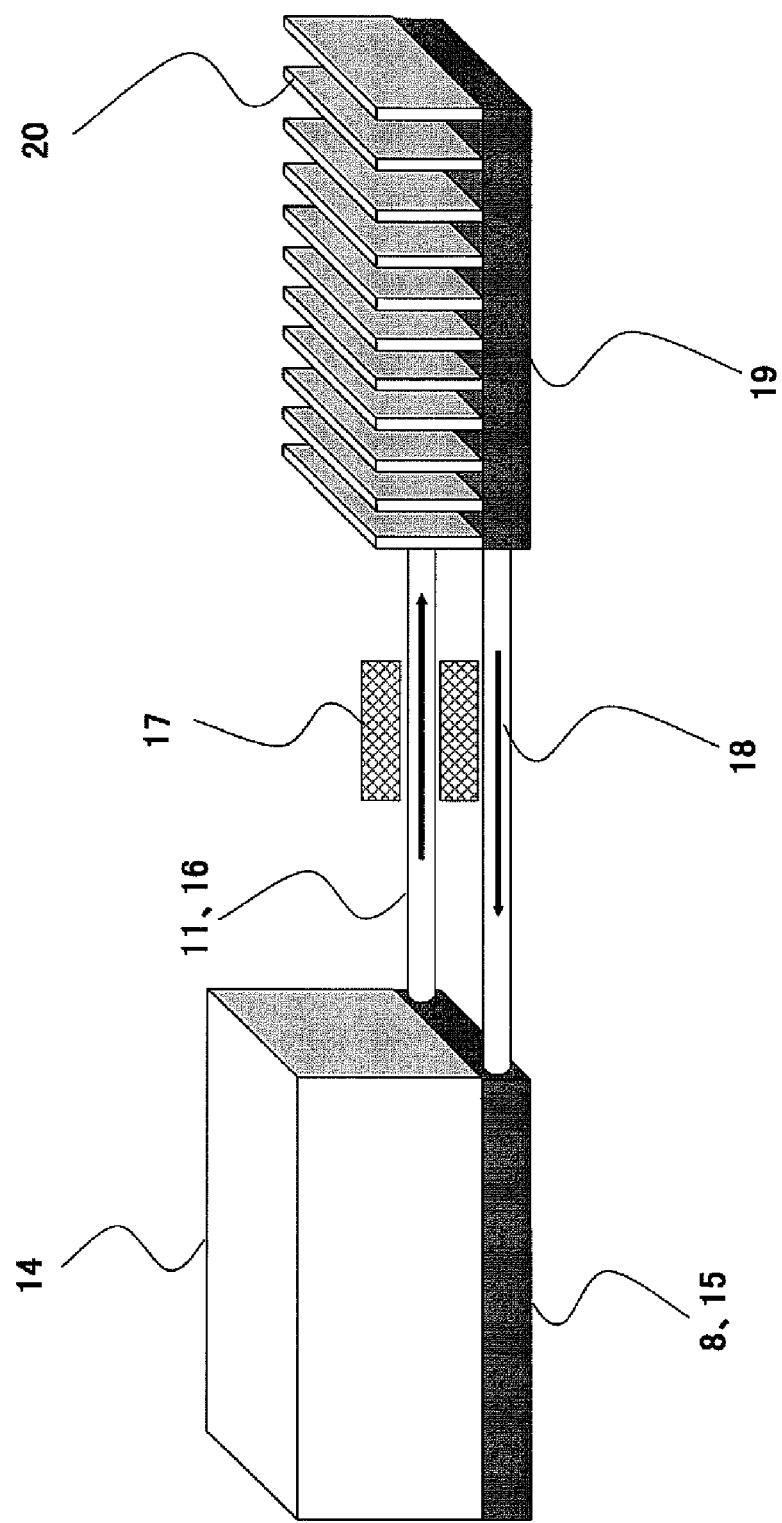
FIG. 11 is a device schematic view of a cooling system.

FIG. 11 is a device schematic view of a cooling system. In the cooling system of FIG. 11, heat absorber 15 which is sealed with liquid metal (same as the above-mentioned liquid metal 8) is provided on the heat generating surface of heat generator 14. Liquid metal 8 is in contact with heat generator 14 directly or indirectly via a wall surface of heat absorber 15, etc., and the heat of heat generator 14 is to be transferred to liquid metal 8. Liquid metal 8 has high thermal conductivity.

Liquid metal 8 having increased temperature due to heat transfer is to be transported to radiator 19. From the surface of radiator 19, heat is to be radiated to the outside of the device such as room air. Radiator 19 has a device such as fin 20 for expanding the heat dissipation area or a fan for cooling forcibly. Heat absorber 15 and radiator 19 are connected by transport piping 16, and has a structure that liquid metal 8 circulates (18) inside of the tubing by transport means such as electromagnetic pump 17.

While it is desirable in the cooling system that liquid metal 8 is attached firmly to the surface of heat absorber 15 or radiator 19, it is desirable in transport piping 16 that liquid metal 8 can be smoothly transported without being attached to the pipes, so that miniaturization of electro-magnetic pump 17 or improvement of radiation efficiency due to increase of circulation flow volume 18 can be facilitated. In the example of FIG. 11, liquid-repellent surface 11 related to the present embodiment is provided on the inner surface of transport piping 16 for smooth transport of liquid metal 8.

In addition, though not shown in the diagram, liquid-repellent surface 11 related to the present embodiment can be applied as an alternative of a dish of mercury currently used as a reflecting mirror of astronomical telescopes, since the above-described liquid metal 8 has high visible light reflectivity.

It is needless to say that various changes may be made on the present embodiment without departing from the scope of the invention.

In accordance with the present embodiment, it is possible to provide a mechanism to which liquid-repellent surface structure 11 hard to be exfoliated is applied. Also, in accordance with liquid-repellent surface 11 related to the present embodiment, it is possible to control the wettability of liquid metal 8 to the surface part. Also, the present embodiment can contribute on reducing loss of piping pressure in the case that liquid metal 8 is used as a medium for transporting heat or pressure. Also by applying the present embodiment on the inner surface of, for example, a container for storing liquid metal 8, firm attachment can be prevented thus operation such as exchange of liquid metal can be easily carried out. The present embodiment also can prevent leakage of liquid metal 8 into a vacuum region in an X-ray tube whereby preventing deterioration of the X-ray tube's ability to withstand voltage. Additionally, the present embodiment makes it possible to prevent depletion of lubricant agent due to leakage of liquid metal 8, which can lead to improvement of duration credibility of a bearing.

The invention claimed is:

1. A mechanism having a non-wetting and liquid-repellent surface structure which repels liquid metal for sealing the liquid metal, characterized in that multiple microprojections which point contact the liquid metal are provided on a base material surface so as to hold surface tension of the liquid metal, and a basal side of the microprojections has greater content of chrome than a tip side thereof.

2. An X-ray tube device having a non-wetting and liquid-repellent structure which repels liquid metal to be applied to a boundary portion between a bearing gap and vacuum in a fluid slide bearing for a rotary anode, characterized in that multiple microprojections which point contact the liquid metal are provided on a base material surface so as to hold surface tension of the liquid metal, and a basal side of the microprojections has greater content of chrome than a tip side thereof.

3. The X-ray tube device according to claim 2, characterized in that the liquid metal is formed by an alloy of gallium/indium/stannum.

4. The X-ray tube device according to claim 3, characterized in that the tip of the microprojections are formed in a generally spherical shape.

5. The X-ray tube device according to claim 3, characterized in that the width and height of the microprojections are in the range of 0.5~3.0 µm.

6. The X-ray tube device according to claim 3, characterized in that the multiple microprojections are formed all over the base material surface.

7. A method for manufacturing a mechanism including a non-wetting and liquid-repelling surface structure which repels liquid metal, the method comprising:

forming multiple microprojections on a base material surface, a basal side of the microprojections having greater content of chrome than a tip side thereof; and causing said multiple microprojections to point contact the liquid metal so as to hold surface tension of the liquid metal.

* * * * *